INVENTORS:
CARL R. MEFFORD
JAMES L. LASS
BART A. SMITH
DOMINIC A. VENIER
THOMAS TROCKI

BY: *Samuel E. Turner*
ATTORNEY

United States Patent Office 3,697,376
Patented Oct. 10, 1972

3,697,376
NUCLEAR FUEL ASSEMBLY WITH FLOW
CHANNEL RESTRAINING MEANS
Carl R. Mefford, James L. Lass, Bart A. Smith, Dominic A. Venier, and Thomas Trocki, San Jose, Calif., assignors to General Electric Company
Filed Aug. 15, 1969, Ser. No. 850,483
Int. Cl. G21c 3/34
U.S. Cl. 176—78                    9 Claims

ABSTRACT OF THE DISCLOSURE

A nuclear fuel assembly incorporating a restraining arrangement for engaging the flow channel and limiting its deflection away from the lower tie plate to control the bypass flow of coolant into the spaces between the fuel assemblies of a nuclear reactor.

BACKGROUND

In a known type of nuclear reactor, for example as used in the Dresden Nuclear Power Station near Chicago, Ill., the reactor core is of the heterogeneous type. That is, the core comprises a plurality of fuel assemblies vertically arranged in an array to form the nuclear reactor core capable of self-sustained nuclear fission reaction. The core is contained in a pressure vessel wherein it is submersed in a working fluid, such as light water, which serves both as a coolant and as a neutron moderator. A plurality of control rods, containing neutron absorbing material, are selectively insertable among the fuel assemblies to control the reactivity of the core.

Each fuel assembly comprises a tubular flow channel containing an array of elongated, cladded fuel elements or rods supported between upper and lower tie plates. The fuel assemblies are supported in the pressure vessel between an upper core grid and a lower core support plate. The lower tie plate of each fuel assembly is formed with a nose piece which fits through an aperture in the core support plate. The nose piece is formed with openings through which the pressurized coolant flows upward through the fuel assembly flow channels to remove heat from the fuel elements. A typical fuel assembly of this type is shown, for example, by D. A. Venier et al. in U.S. Pat. No. 3,350,-275. In nuclear reactors of recent design in-core nuclear instrumentation, in the form of neutron detectors, are contained in instrumentation receptacles located in the gaps between the fuel assemblies.

In a water reactor heat is transferred from the fuel through the fuel rod cladding to the water flowing upward among the fuel rods. At some elevation the flowing water reaches saturation temperature and beyond this point increasing fractions of the water are converted to the vapor phase. Normally the heat transfer coefficient between the fuel rod cladding and the water is substantially constant. However, if the heat-flux and consequently the steam fraction is increased sufficiently, a threshold is reached at which the heat transfer coefficient decreases suddenly by a factor of 5 to 10. This is caused by a change in the heat transfer mechanism from nucleate boiling to film boiling and it results in a very rapid, undesirable rise in fuel rod cladding temperature. The heat flux at the threshold between nucleate boiling and film boiling is designated the "critical heat flux."

An important consideration in the design of boiling water reactors is the relationship between the in-channel flow or the coolant flow through the fuel assembly flow channels and the bypass flow or the coolant flow through the gaps among the fuel assemblies. On the one hand it is desirable to maximize the in-channel flow to thereby maximize the margin to critical heat flux. On the other hand it is necessary to provide a limited amount of bypass to avoid coolant stagnation and steam voids and adequately to cool the control rods and the in-core instrumentation devices located in the gaps between the fuel assembly flow channels. Thus for a given total core recirculation flow, the desirable balance between in-channel and bypass flow maintains an adequate margin to critical heat flux while avoiding excess out-of-channel voids.

In prior arrangements control of bypass flow is accomplished by allowing an amount of coolant leakage between the assembly flow channel and the lower tie plate. The flow channel is not fixed to the fuel assembly but is instead a slip fit over the upper and lower tie plates so that it readily can be removed and reused with new fuel assemblies during refueling and for inspection of the fuel assemblies. The flow channel is formed of relatively thin material due to space limitations and to minimize parasitic neutron absorption and it is found that increases in pressure of the coolant (to increase coolant flow through the fuel assemblies) causes the flow channel to deflect away from the lower tie plate thus causing an excessive amount of bypass flow with the danger of depriving the fuel assembly of its required coolant flow.

The prior arrangements for bypass flow have been found inadequate for nuclear reactors of recent design which operate at higher power density, higher steam qualities and lower thermal margins. Thus it is found desirable to provide more stringent and accurate control of the bypass flow.

SUMMARY

It is an object of the invention to provide an improved fuel assembly incorporating a bypass flow control arrangement which maintains the bypass flow at a substantially constant percentage of the total core flow and which does not unduly compromise the ease of removing and replacing the flow channel.

These and other objects are accomplished according to the present invention by providing a restraining arrangement for engaging the flow channel and limiting its deflection away from the lower tie plate.

In accordance with a first illustrated embodiment the channel restraining arrangement is formed by a sleeve secured to the lower tie plate so as to form a longitudinally opening groove adapted to receive the lower end of the flow channel. In this manner the lower end of the channel is sandwiched between the sleeve and the surface of the lower tie plate whereby lateral movement of the channel away from the tie plate is restrained. The sleeve may be plane or corrugated.

In accordance with a second illustrated embodiment the lower tie plate is fitted with a series of headed studs or buttons for receiving and engaging a corresponding series of longitudinal open-ended slots in the lower end of the flow channel.

In accordance with a third embodiment of the invention the channel restraining arrangement comprises a longitudinally opening groove or seat formed in the lower tie plate and adapted to receive and restrain the lower end of the flow channel. Since the groove or seat is relatively shallow, a retainer spring arrangement is provided for urging the flow channel into engagement with the channel retainer seat.

BRIEF DESCRIPTION OF THE DRAWING

The invention is described more specifically hereinafter with reference to the accompanying drawing wherein.

GENERAL DESCRIPTION

Figure 1:
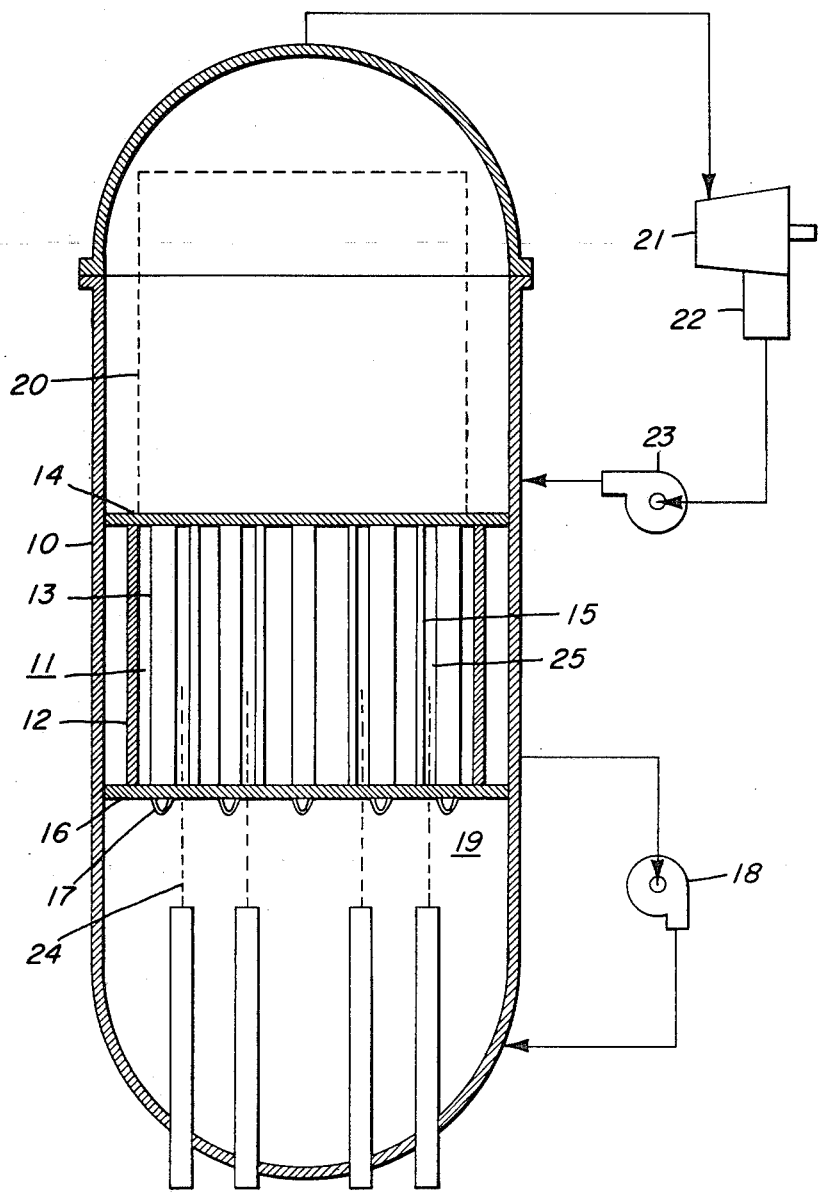
FIG. 1 is a schematic illustration of a nuclear reactor steam generator.

The invention is described herein in connection with a water cooled and moderated nuclear reactor, an example of which is illustrated in FIG. 1. Such a reactor system includes a pressure vessel 10 containing a nuclear chain reactor core 11 submersed in a coolant such as light water. The core 11 is surrounded by an annular shroud 12. The core 11 includes a plurality of replaceable fuel assemblies 13 arranged in spaced relation and supported in the vessel 10 between an upper core grid 14 and a lower core support plate 16. Each fuel assembly includes a nose piece 17 which engages a support socket in the support plate 16. The end of the nose piece projects through the support plate 16 and is formed with openings for communication with a coolant supply chamber 19. A circulation pump 18 pressurizes the coolant in the supply chamber 19 from which the coolant is forced through the openings in the nose pieces 17 upward through the fuel assemblies. A part of the coolant is thereby converted to steam which passes through a separator-dryer arrangement 20 to a utilization device such as a turbine 21. Condensate formed in a condenser 22 is returned as feedwater to the vessel 10 by a pump 23. A plurality of control rods 24 are selectively insertable among the fuel assemblies 13 for control of the reactivity of the core. A plurality of instrumentation receptacles 15 are positioned among the fuel assemblies to contain neutron detectors for monitoring the power level of the core.

Figure 2:
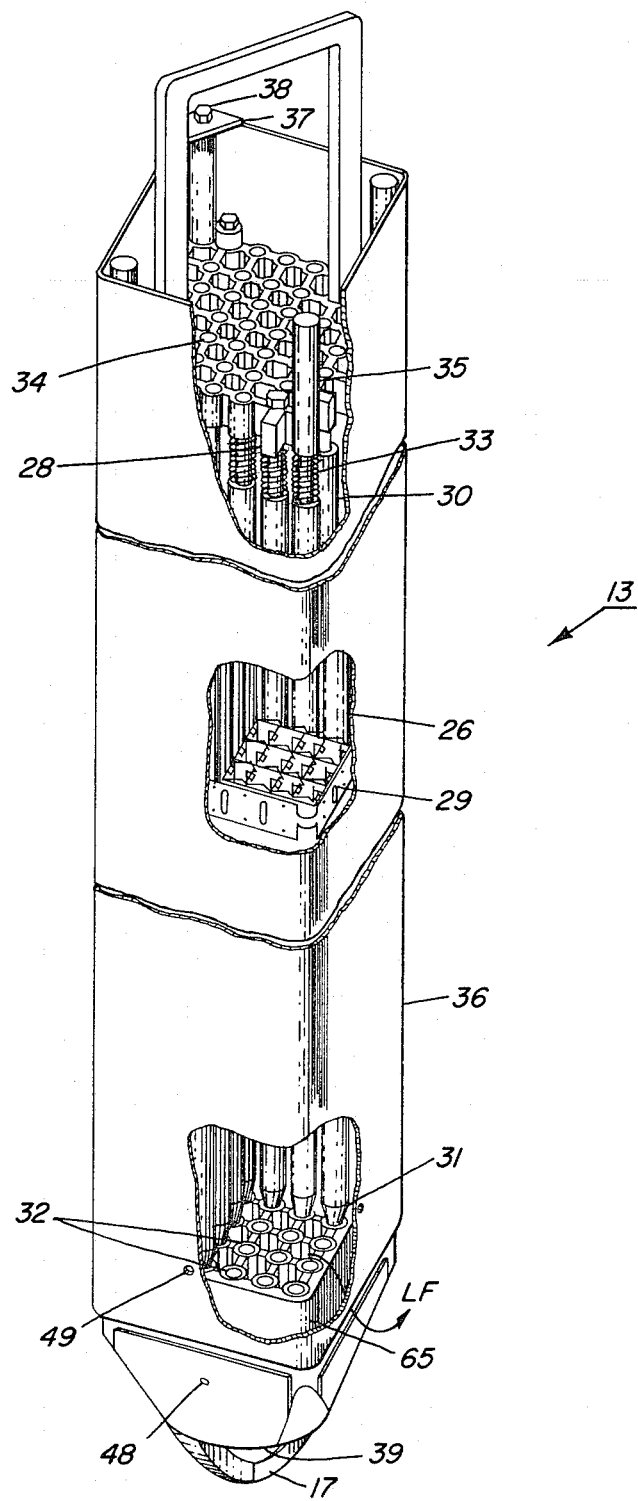
FIG. 2 is a partly cutaway perspective view of a fuel assembly.

Illustrated in FIG. 2 is a fuel assembly 13 comprising a plurality of elongated fuel rods 26 supported between a lower tie plate 27 and a skeletonized upper tie plate 28. The fuel rods 26 pass through a plurality of fuel rod spacers 29 which provide intermediate support to retain the elongated rods in spaced relation and restrain them from lateral vibration.

Each of the fuel rods 26 comprises an elongated tube containing the fissile fuel, in the form of pellets, particles, powder or the like, sealed in the tube by upper and lower end plugs 30 and 31. Lower end plugs 31 are formed with a taper for registration and support in support cavities 32 which are formed in the lower tie plate 27. Upper end plugs 30 are formed with extensions 33 which register with support cavities 34 in the upper tie plate 28.

Several of the support cavities 32 (for example, selected ones of the edge or peripheral cavities) in the lower tie plate 27 are formed with threads to receive fuel rods having threaded lower end plugs 31. The extensions 33 of the upper end plugs 30 of these same fuel rods are elongated to pass through the cavities in upper tie plate 28 and are formed with threads to receive internally threaded retaining nuts 35. In this manner the upper and lower tie plates and the fuel rods are formed into a unitary structure.

The fuel assembly 13 further includes a thin-walled tubular flow channel 36, of substantially square cross section, adapted to provide a sliding fit over the lower and upper tie plates 27 and 28 and the spacers 29 so that it readily may be mounted and removed. The channel 36 has a tab 37 welded to the top end which provides for fastening the channel to the fuel bundle with a bolt 38.

The lower tie plate 27 is formed with a nose piece 17 adapted, as mentioned hereinbefore, to support the fuel assembly in a socket in the support plate 16 (FIG. 1). The end of the nose piece is formed with openings 39 to receive the pressurized coolant so that it flows upward among the fuel rods.

To avoid stagnation of the coolant in the spaces 25 (FIG. 1) among the fuel assemblies, a portion (in the order of 5-6 percent) of the coolant flow into each fuel assembly is allowed to leak into the adjacent spaces 25 from between the lower tie plate 27 and the channel 36 of the fuel assembly as indicated by the arrow legended LF in FIG. 2 or through special bypass flow passages 48 in the lower tie plate 27 or through bypass flow passages 49 in the flow channel 36. As discussed hereinbefore, the prior arrangements have not provided adequate regulation of this leakage flow and in accordance with the present invention leakage is controlled by means for limiting the deflection of the flow channel away from the lower tie plate.

First embodiment

Figure 3A:
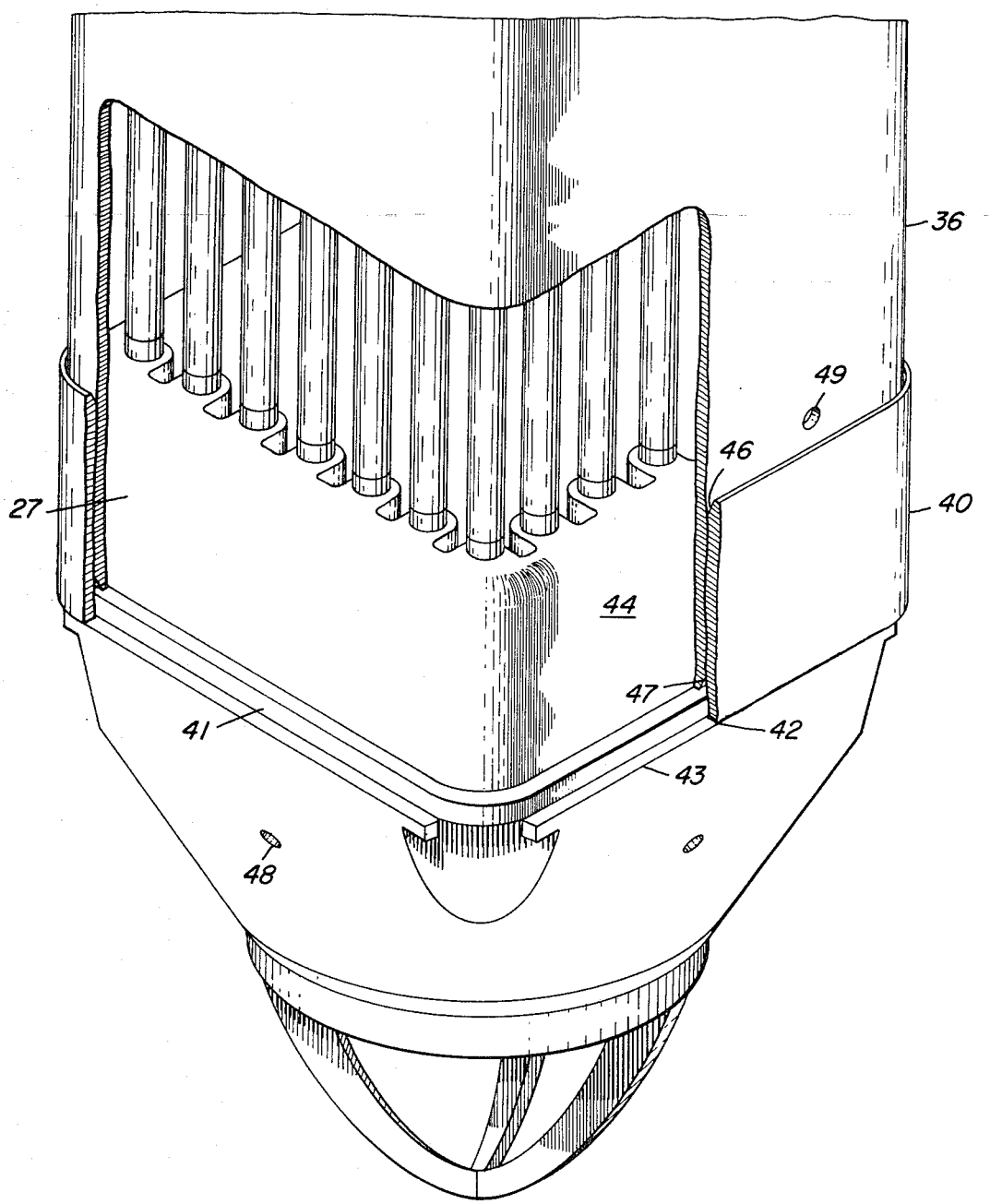
FIG. 3a is an enlarged view of the lower portion of the fuel assembly illustrating the leakage control sleeve of the first embodiment.

A first embodiment of the invention is illustrated in FIG. 3a. In this embodiment the channel restrainer is in the form of a sleeve 40. The sleeve 40 abuts an inner shoulder 41 and is welded (or riveted), as at 42, to an outer shoulder 42. The sleeve 40 and the outer surface 44 of the lower tie plate 27 thus form a longitudinally opening slot for receiving the lower portion of the flow channel 36. With the flow channel 36 thus sandwiched between the sleeve 40 and the lower tie plate, the length of the leakage flow path is substantially lengthened, thus increasing the leakage flow resistance, and the sleeve 40 substantially prevents the expansion of the flow channel 36 away from the lower tie plate 27. The upper-inner edge 46 of sleeve 40 and outer-lower edge 47 of the flow channel 36 are chamfered to facilitate mounting of the channel.

In addition to the leakage flow between the lower tie plate 27, the flow channel 36 and the sleeve 40, bypass flow passages 48 in the lower tie plate and /or 49 in the lower part of the flow channel, may be provided.

Figure 3B:
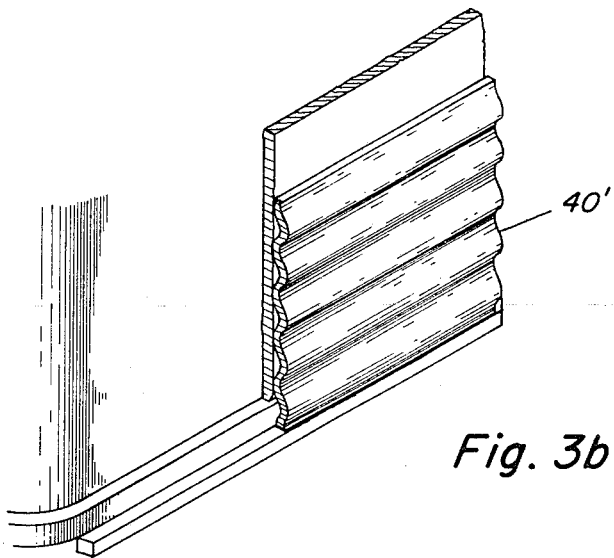
FIG. 3b is a fragmentary view illustrating a corrugated version of the leakage control sleeve.

Illustrated in FIG. 3b is a modified version of the first embodiment wherein sleeve 40' is formed with corrugations. The convolutions increase the leakage flow resistance and increase the rigidity of the sleeve.

Second embodiment

Figure 4:
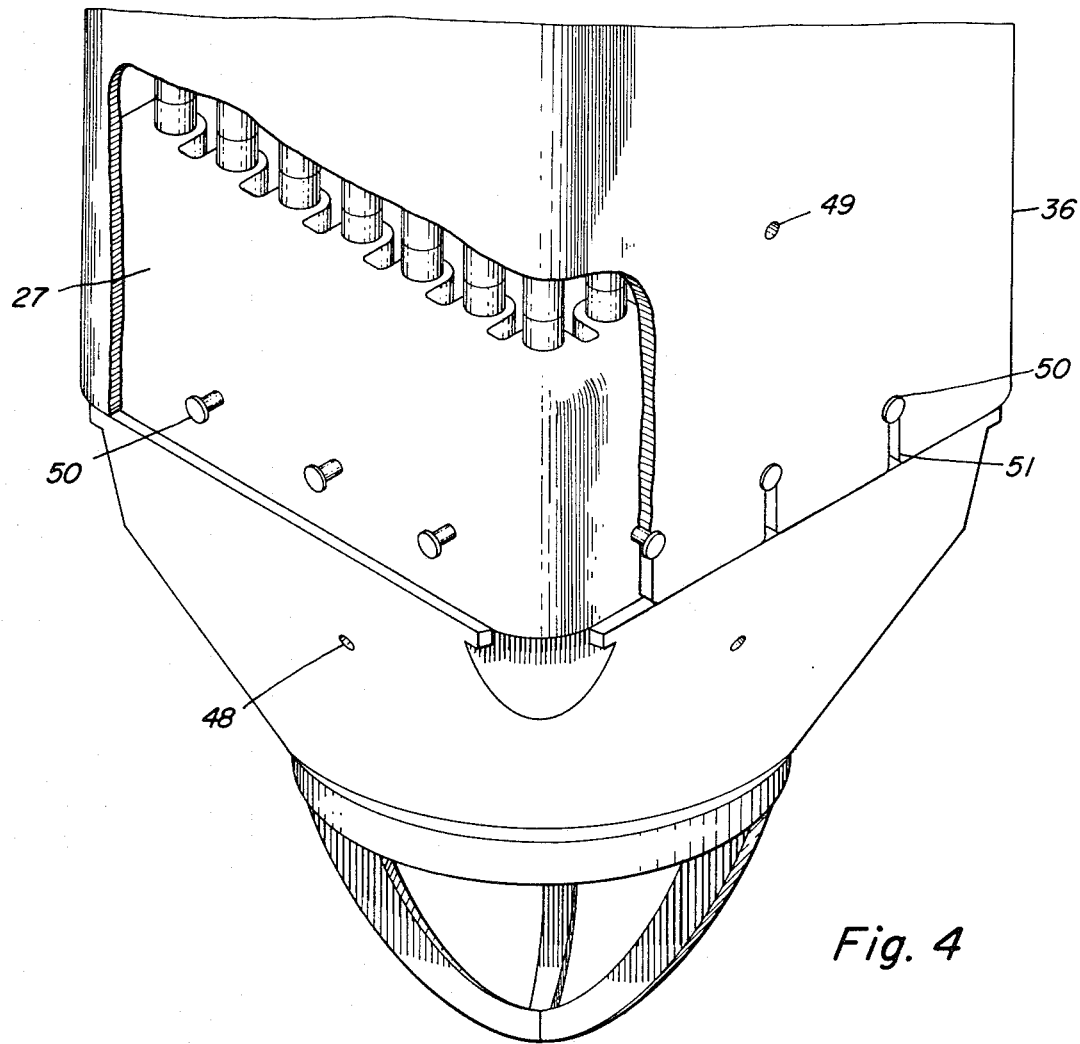
FIG. 4 is an enlarged view of the lower portion of the fuel assembly illustrating the slot and button leakage control arrangement of the second embodiment of the invention.

A second embodiment of the invention is illustrated in FIG. 4. In this embodiment the flow channel 36 is restrained from movement away from the lower tie plate 27 by a series of headed studs or buttons 50 secured to the lower tie plate 27 and adapted to engage respective open-ended slots 51 formed in the bottom of the flow channel 36. The ends of the slots 51 and the inner edges of the buttons 50 may be rounded to facilitate mounting of the flow channel 36.

Third embodiment

Figure 5:
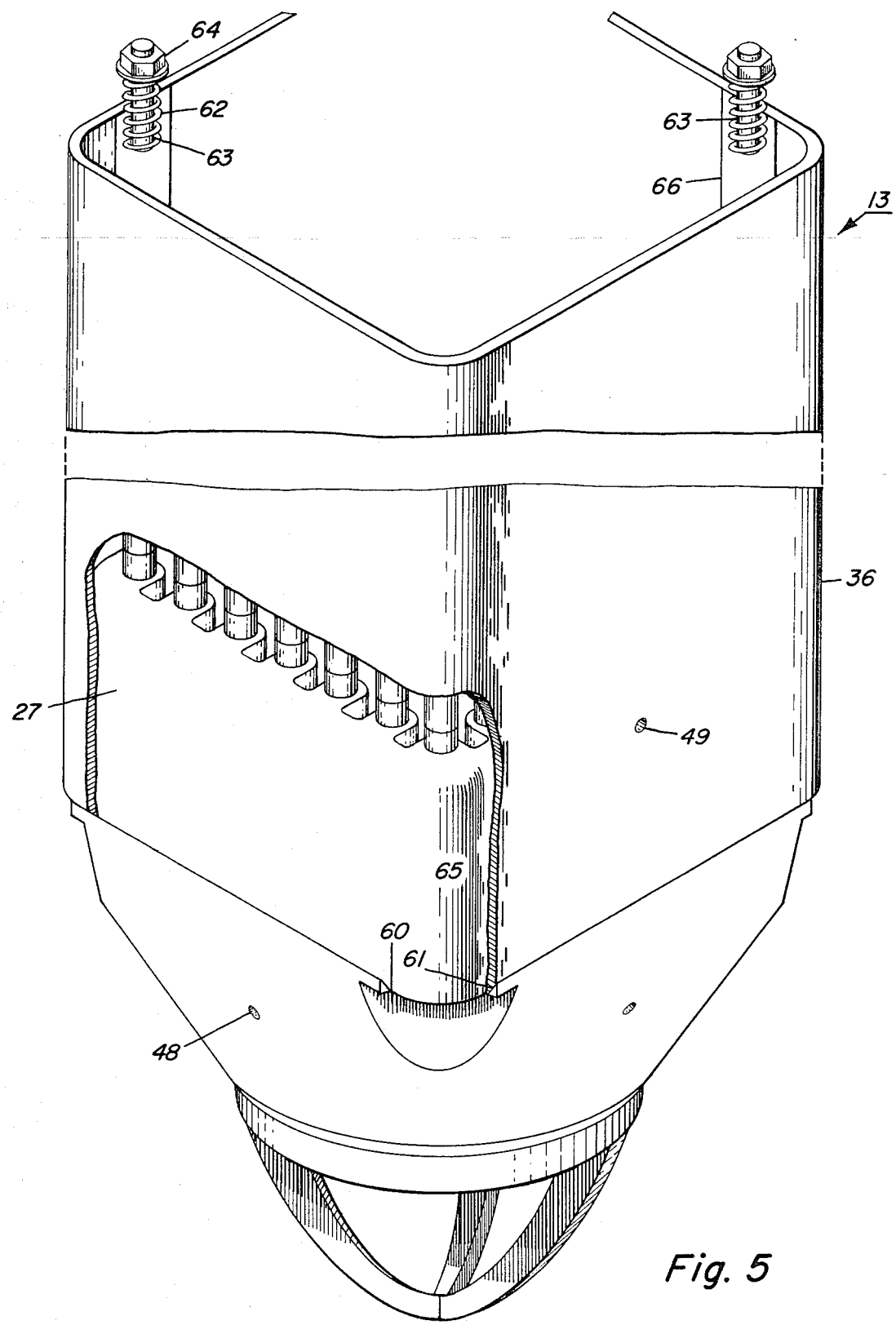
FIG. 5 is an enlarged view of the lower portion of the fuel assembly illustrating the leakage control seat of the third embodiment.

A third embodiment of the invention is illustrated in FIG. 5. In this embodiment the flow channel is restrained from movement away from the lower tie plate by the inwardly tapered seat 60 formed in the lower tie plate 27 and adapted to engage a matching taper 61 formed around the lower end of the flow channel 36. The flow channel is maintained in engagement with the seat 60 by a retainer spring arrangement at two opposite upper corners of the fuel assembly 13. Each retainer spring arrangement comprises a spring 62 fitted over a stud 63 attached to the upper tie plate 28, the spring 62 being compressed between a nut 64 and a bar 66 attached to the flow channel 36. In this manner, the springs 62 exert a downward force on the flow channel 36 to maintain the end of the flow channel in engagement with the seat 60.

For fuel assemblies of square cross-section as shown herein it is found unnecessary to extend the seat 60 around the corners 65 of the lower tie plate 27 because the flow channel 36 tends to fit tightly against these corners. However, the seat 60 may be extended around the corners if found desirable for greater restriction of leakage flow.

Figure 6:
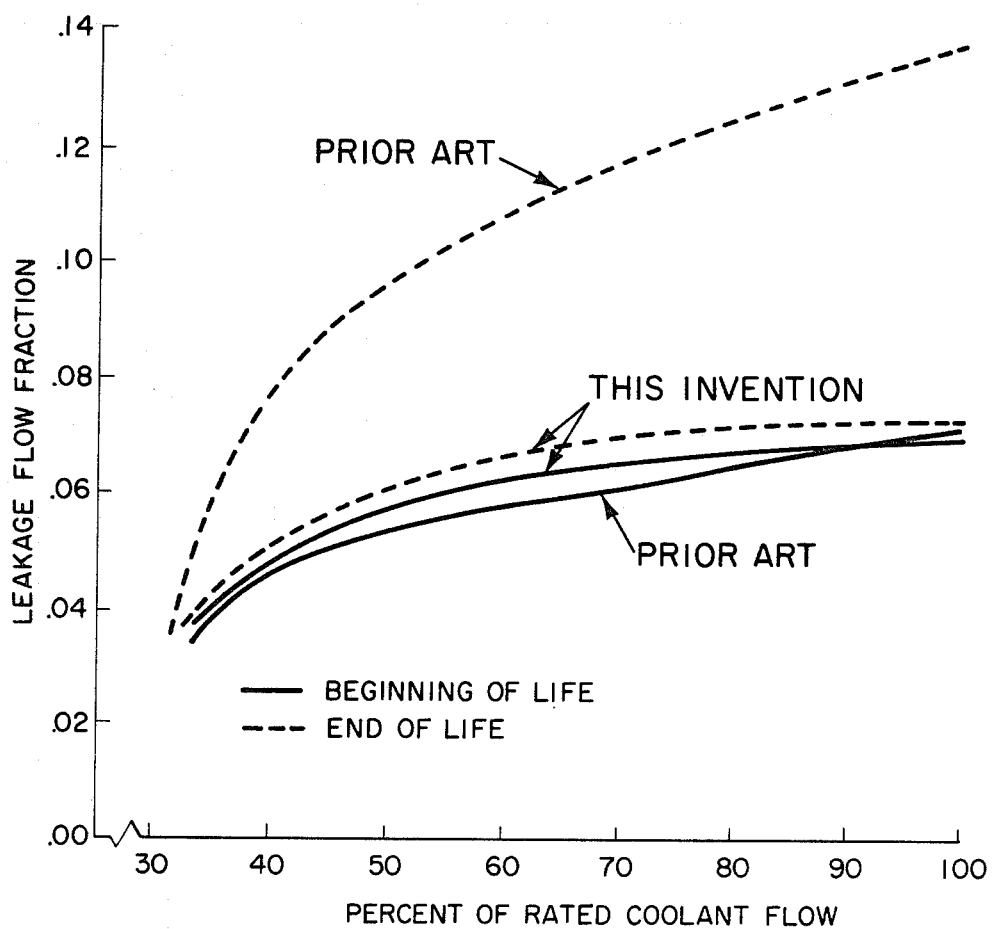
FIG. 6 is a graphical illustration of the performance of the present invention compared to the performance of the prior art arrangement.

The effectiveness of the present invention is graphically illustrated in FIG. 6 which compares the performance of the flow control arrangement of the invention with the prior art arrangement which relied only upon a predetermined fit between the flow channel 36 and the lower tie plate 27. The solid curves show the performance of new fuel assemblies while the dashed curves show end-of-life performance, that is, after the assembly has been operated in a reactor core on the order of several years. For the prior art arrangement the leakage flow increases by more than one-third with life while for the arrangement of the present invention the leakage flow change with life is less than one percent. Changes in leakage flow friction with changes in coolant flow are significantly less for the arrangement of the present invention. A further outstanding advantage of the invention is that it does not compromise or unduly complicate the ready removal and replacement of the flow channel 36.

While illustrative embodiments of the invention have been described herein, modifications and adaptations thereof may be made by those skilled in the art without departure from the spirit and scope of the invention as defined by the following claims.

What is claimed is:

1. A fuel assembly comprising a plurality of fuel rods positioned in spaced array by upper and lower tie plates, said lower tie plate having means to receive therethrough a flow of coolant, an open-ended tubular flow channel surrounding said array for conducting said coolant upward past said fuel rods, a portion of the lower end of said channel closely surrounding a peripheral surface of said lower tie plate, said channel being attached to said assembly solely at the top of said assembly with readily releasable attachment means and said channel being free from and detached from said lower tie plate so that said channel readily is removable from said assembly, means separate from said flow channel connecting said upper and lower tie plates together and maintaining said fuel rods in said spaced array independent of said flow channel, and restraining means attached to said lower tie plate for restraining lateral movement of said lower end of said flow channel away from said peripheral surface of said lower tie plate.

2. The fuel assembly of claim 1 wherein said restraining means comprises an axially extending peripheral slot in said lower tie plate for receiving said lower end portion of said channel.

3. The fuel assembly of claim 1 wherein said restraining means comprises a sleeve surrounding said lower tie plate, the upper part of said sleeve being spaced from said surface of said lower tie plate and the lower part of said sleeve being attached to said lower tie plate to provide an axially extending slot for receiving said lower end portion of said flow channel for restraining said flow channel from movement away from said peripheral surface.

4. The fuel assembly of claim 3 wherein said sleeve is corrugated.

5. The fuel assembly of claim 1 wherein said fuel assembly is from four-sided to six-sided in cross-section and wherein said restraining means comprises a separate restraining member secured to each separate side of said lower tie plate, the upper part of each said restraining member being spaced from said surface of said lower tie plate and the lower part of each restraining member being attached to said lower tie plate to provide axially extending slots for receiving said lower end of said flow channel.

6. The fuel assembly of claim 5 wherein said restraining members are corrugated.

7. The fuel assembly of claim 1 wherein said restraining means comprises a series of circumferentially spaced, longitudinally extending, open-ended slots in the lower end of said flow channel adjacent said lower tie plate, and a corresponding series of laterally extending, headed studs secured to said lower tie plate, said studs engaging said slots and the heads of said studs restraining movement of said lower end of said flow channel away from said lower tie plate.

8. The fuel assembly of claim 1 wherein said restraining means comprises a longitudinally extending peripherally positioned groove in said lower tie plate for receiving said lower end of said flow channel to thereby restrain said end of said flow channel from lateral movement.

9. The fuel assembly of claim 8 further including resilient means exerting a force between said flow channel and said lower tie plate in the direction of engagement of said flow channel with said groove.

References Cited

UNITED STATES PATENTS

| | | | |
|---|---|---|---|
| 3,104,218 | 9/1963 | Speidel et al. | 176—78 |
| 3,309,280 | 3/1967 | Balog | 176—61 |
| 3,317,399 | 5/1967 | Winders | 176—78 |
| 3,344,036 | 9/1967 | Haslam et al. | 176—76 X |
| 3,350,275 | 10/1967 | Venier et al. | 176—76 X |
| 3,395,077 | 7/1968 | Long Sun Tong et al. | 176—78 |

FOREIGN PATENTS

| | | | |
|---|---|---|---|
| 1,029,061 | 5/1966 | Great Britain | 176—78 |
| 1,030,466 | 5/1966 | Great Britain | 176—78 |

CARL D. QUARFORTH, Primary Examiner

G. G. SOLYST, Assistant Examiner

U.S. Cl. X.R.

176—76